(12) United States Patent
Mahadevan et al.

(10) Patent No.: US 10,673,701 B2
(45) Date of Patent: Jun. 2, 2020

(54) PHY ABILITY AUTO-NEGOTIATION SYSTEM

(71) Applicant: Dell Products L.P., Round Rock, TX (US)

(72) Inventors: Sridhar Mahadevan, Chennai (IN); Ming Chung Chow, Pleasanton, CA (US); Kannan Elayarajan, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 38 days.

(21) Appl. No.: 15/961,466

(22) Filed: Apr. 24, 2018

(65) Prior Publication Data

US 2019/0327146 A1 Oct. 24, 2019

(51) Int. Cl.
*H04L 12/24* (2006.01)
*G06F 11/20* (2006.01)
*H04B 10/27* (2013.01)
*H04B 10/40* (2013.01)

(52) U.S. Cl.
CPC ...... *H04L 41/0869* (2013.01); *H04L 41/0886* (2013.01); *G06F 11/2033* (2013.01); *H04B 10/27* (2013.01); *H04B 10/40* (2013.01)

(58) Field of Classification Search
CPC . H04L 41/0869; H04L 41/0886; H04B 10/27; H04B 10/40; G06F 11/2033
See application file for complete search history.

(56) References Cited

U.S. PATENT DOCUMENTS

| | | | | |
|---|---|---|---|---|
| 7,385,931 B2* | 6/2008 | Magnaghi | ........... | H04L 41/0869 370/218 |
| 7,830,875 B2* | 11/2010 | Ranjan | ................... | H04L 47/10 370/389 |
| 8,040,852 B2* | 10/2011 | Gupta | ................... | H04L 69/329 370/331 |
| 9,699,033 B2* | 7/2017 | Robitaille | ............. | H04L 5/1438 |
| 2008/0310432 A1* | 12/2008 | Ranjan | ................... | H04L 47/10 370/401 |
| 2015/0350867 A1* | 12/2015 | Chaponniere | ......... | H04W 40/04 370/254 |
| 2016/0350239 A1* | 12/2016 | Colline | ................ | G06F 13/102 |
| 2017/0026241 A1* | 1/2017 | Robitaille | ............. | H04L 5/1438 |
| 2017/0180088 A1* | 6/2017 | Adachi | ................ | H04W 84/12 |
| 2017/0181039 A1* | 6/2017 | Adachi | ................ | H04W 48/10 |
| 2017/0272324 A1* | 9/2017 | Robitaille | ............. | H04L 5/1438 |
| 2017/0315887 A1* | 11/2017 | Olson | ................ | G06F 11/2033 |
| 2018/0219732 A1* | 8/2018 | Liu | ..................... | H04L 41/0813 |
| 2019/0245923 A1* | 8/2019 | Williams | ............. | G06F 3/0619 |

* cited by examiner

*Primary Examiner* — Brian T O Connor
(74) *Attorney, Agent, or Firm* — Haynes and Boone, LLP

(57) ABSTRACT

A system includes a first device having a first physical layer transceiver (PHY) and a first port that is coupled to the first PHY and that operates in a mode. The system also includes a second device having a second PHY and a second port that is coupled to the second PHY and that operates in a mode. The second device provides, through the second port via a cable coupled to the first port to the first device and prior to advertising the at least one mode that the second port is configured to operate in, a second PHY ability of the second PHY. The second device receives a first PHY ability of the first PHY and determines that a mismatch exists between the first and second PHY abilities. In response to the mismatch, the second device adjusts the operation of the second PHY to correct the mismatch.

20 Claims, 5 Drawing Sheets

500

| Bit(s) | NAME | Description |
|---|---|---|
| 0 | 100G_AN requested | 0=not requested, 1=requested |
| 1 | 50G_AN requested | 0=not requested, 1=requested |
| 2 | 25G_AN requested | 0=not requested, 1=requested |
| 3 | Clause 91 RS-FEC for 100GbE | 0=no ability, 1=capable |
| 4 | Clause 108 RS-FEC for 25GbE/50GbE | 0=no ability, 1=capable |
| 5 | Clause 74 Base-R or Firecode FEC for 25GbE/50GbE | 0=no ability, 1=capable |
| 6-8 | Reserved for Future FEC Types | |
| 9-10 | Media Type Detection per MSA SFF-8024 | 0X01 – AOC with 1E-5 pre-FEC BER<br>0X02 – SR or SR4<br>0X03 – LR or LR4<br>0X04 – ER<br>. . . |
| 11-15 | Reserved for Future Use | FIELD |

502: bits 0–2
504: bits 3–5
508: bits 6–8
506: bits 9–10
510: bits 11–15

FIG. 5

PHY ABILITY AUTO-NEGOTIATION SYSTEM

BACKGROUND

The present disclosure relates generally to information handling systems, and more particularly to mismatch detection and correction for physical layer transceiver (PHY) abilities in an auto-negotiation system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, networking devices and other computing devices, often include the ability to transmit and receive Ethernet protocol communications via transceivers such as Small Form-factor Pluggable (SFP) transceivers, enhanced Small Form-factor Pluggable (SFP+) transceivers, SPF28 transceivers, 10 Gigabit Small Form-factor Pluggable (XFP) transceivers, Quad(4-channel) Small Form-factor Pluggable (QSFP or QSFP+) transceivers, and/or a variety of other transceivers known in the art. Depending on the type of transceiver used, a port on a computing device may be configured to transmit data in a variety of operation modes according to several variable transmission parameters including, for example, transmission speed, duplex mode, flow control, and/or a variety of other transmission parameters known in the art. Each computing device may have different variable transmission parameters defined by the computing device manufacturer or based on when the computing device was manufactured, and thus any particular computing device may have a different set of operation modes than the computing device(s) to which it is connected.

In order to address the possibility of computing devices transmitting data in different operation modes, auto-negotiation was developed. Auto-negotiation is used by connected computing devices to determine the best operation mode that is shared by each of the connected computing devices. More specifically, auto-negotiation is a physical layer ability used in Ethernet networks to allow two connecting computing devices to negotiate the appropriate variable transmission parameters and settle on the highest, mutually supported set of data transmission operation characteristics. The concept was introduced as part of the Fast Ethernet standard, and has progressed as each new Ethernet technology has come to market, incorporating new technology abilities as required. To keep pace with the rapid evolution of technology in a data center, the networking industry continues to deliver computing devices with higher and higher bandwidth capabilities. For example, the finalization of the Institute of Electrical and Electronics Engineers (IEEE) 802.3bj standard, as well as the introduction of 100 Gbps over 4×25G physical layer (PHY), has opened a path to 25 GbE over a single lane. The 25 Gigabit Ethernet Consortium was formed with the intent to quickly drive a standard for 25 Gigabit Ethernet (GbE) over a single lane based off of the IEEE 802.3bj standard. Shortly after the 25 Gigabit Ethernet Consortium formed, the IEEE 802.3 Task Force for single lane 25 Gbps Ethernet was also formed, and these two bodies continued developing their version of a standard in parallel. As each of these standards leverage the IEEE 802.3bj standard, they are similar, but there were also some slight differences. For example, depending on when a given 25 GbE computing device was introduced to the market, the computing device may have been pre-standard (i.e., both Consortium and IEEE), compliant with the 25 Gigabit Ethernet Consortium standard, compliant with IEEE 802.3by (25 Gigabit Ethernet) standard, or combination with both the 25 Gigabit Ethernet Consortium standard and the IEEE 802.3by (25 Gigabit Ethernet) standard.

With the advent of these standards, auto negotiation as well as other physical layer abilities such as forward error correction (FEC) have become very important for the link to be enabled between computing devices. Because each computing device that is being connected together may have been manufactured at a different point in time with respect to the 25 GbE "standards," each may have slightly different capabilities and/or default settings. Furthermore, auto-negotiation and FEC settings may vary based on the cable that is plugged into the transceiver. For example, typically auto-negotiation and FEC are enabled at a computing device having a SFP28 transceiver for an SFP28 direct attach copper (DAC) cable, auto-negotiation is disabled and FEC is enabled for an SFP28 active optic cable (AOC) or an SFP28 short range (SR) cable, and both auto-negotiation and FEC are disabled for SFP28 long reach (LR) cables. These different capabilities and/or settings between computing devices (i.e., auto-negotiation mismatch and FEC mismatch) may diminish the functionality of the auto-negotiation capabilities and/or result in a failure to establish a link between the connected computing devices. These issues often require an administrator to manually determine the auto-negotiation and FEC abilities of each machine, determine where the mismatch exists, and manually change the PHY settings in one or both of the computing devices to correct the mismatches.

Accordingly, it would be desirable to provide an improved auto-negotiation system.

SUMMARY

According to one embodiment, an information handling system includes a first communication subsystem that includes a first physical layer transceiver (PHY) device and a first port that is coupled to the first PHY device and that is configured to operate in at least one mode; a processor coupled to the first communication subsystem; and a memory system that is coupled to the processing system and that includes instructions that, when executed by the processing system, cause the processing system to: provide, through the first port via a cable to a second computing device and prior to advertising the at least one mode that the first port is configured to operate in, a first PHY ability of the first PHY device, wherein the second computing device has a second communication subsystem that includes a second PHY device and a second port that is coupled to the second PHY device and that is configured to operate in at least one mode, and wherein the first port and the second port are coupled together via a cable; receive, through the first port via the cable from the second computing device, a second PHY ability of the second PHY device; and determine that a mismatch exists between the first PHY ability and the second PHY ability and, in response, adjust the operation of the first PHY device to correct the mismatch.

BRIEF DESCRIPTION OF THE DRAWINGS

FIG. 5 is a table illustrating an embodiment of a data structure for PHY abilities may be stored in a memory of the auto-negotiation system of FIG. 2.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
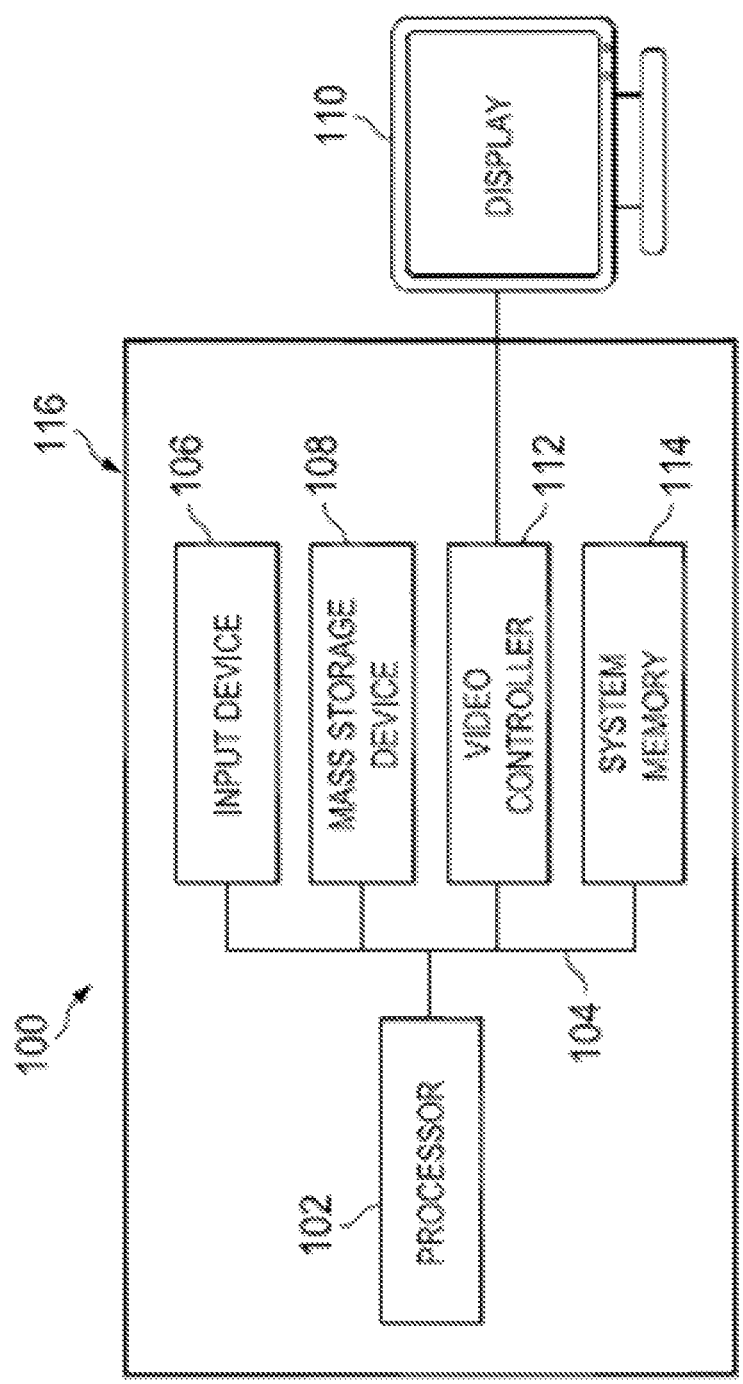
FIG. 1 is a schematic view illustrating an embodiment of an information handling system (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
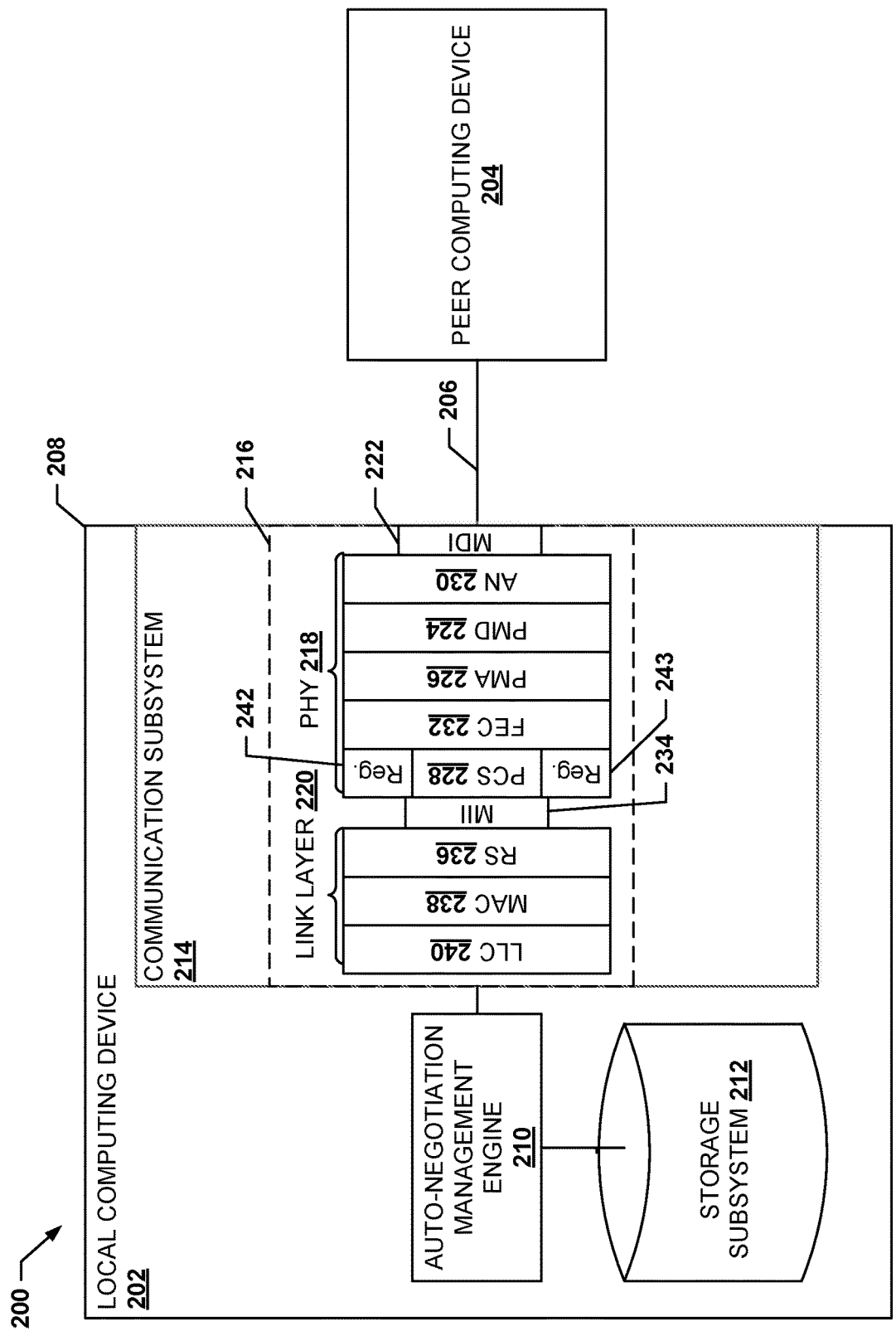
FIG. 2 is a schematic view illustrating an embodiment of an auto-negotiation system.

Referring now to FIG. 2, an embodiment of an auto-negotiation system 200 is illustrated. In the illustrated embodiment, the auto-negotiation system 200 includes a local computing device 202 and a peer computing device 204, either or both of which may be provided by the IHS 100 discussed above with reference to FIG. 1, and/or may include some or all of the components of the IHS 100. For example, the local computing device 202 and the peer computing device 204 may include one or more networking devices (e.g., routers, switches, bridges), storage systems, server devices, and/or other computing devices (e.g., desktop computing device(s), laptop/notebook computing device (s), tablet computing device(s), mobile phone(s), etc.) that would be apparent to one of skill in the art in possession of the present disclosure. The local computing device 202 and the peer computing device 204 may be coupled together by a cable 206. The cable 206 may be any of a variety of electrical or optical cables such as, for example, direct attach copper (DAC) cables, active optic cables (AOC), short range (SR) optic cables, long reach (LR) optic cables, extended reach (ZR) optic cables, and/or any other cable that would be apparent to one of skill in the art in possession of the present disclosure. The cable 206 may include connectors at either end of the cable 206 that may be provided by one or more connectors configured to couple with Small Form-factor Pluggable (SFP) transceivers, enhanced Small Form-factor Pluggable (SFP+) transceivers, SPF28 transceivers, 10 Gigabit Small Form-factor Pluggable (XFP) transceivers, Quad(4-channel) Small Form-factor Pluggable (QSFP or QSFP+) transceivers, and/or a variety of other transceivers that would be apparent to one of skill in the art in possession of the present disclosure. The cable 206 may span a length such as 1 m, 2 m, 3 m, 5 m, 7 m, 10 m, 15 m, 20 m, 100 m, 10 km, and/or any other length that would be apparent to one of skill in the art in possession of the present disclosure.

In the illustrated embodiment, the local computing device 202 includes a chassis 208 that houses the components of the local computing device 202, only some of which are illustrated in FIG. 1. For example, the chassis 208 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an auto-negotiation management engine 210 that is configured to perform the functions of the auto-negotiation management engines and the local computing devices discussed below.

The chassis 208 may also house a storage system (not illustrated, but which may include the storage device 108 discussed above with reference to FIG. 1) that is coupled to the auto-negotiation management engine 210 (e.g., via a coupling between the storage device and the processing system) and that includes a storage subsystem 212 that is configured to store the rules, settings, and/or other data utilized by the auto-negotiation management engine 210 to provide the functionality discussed below. The chassis 208 may also house a communication subsystem 214 that is coupled to the auto-negotiation management engine 210 (e.g., via a coupling between the communication subsystem 214 and the processing system), and that may include a network interface controller (NIC), a wireless communication subsystem, and/or other communication components known in the art.

In an embodiment, the communication subsystem 214 may include an Ethernet transceiver device 216 that is configured according to the IEEE communications standards followed by the 25 Gigabit Ethernet Consortium and the IEEE 802.3 Task Force for single lane 25 Gigabyte Ethernet (GbE), discussed above. As would be understood by one of skill in the art in possession of the present disclosure, the IEEE communications standards follow a reference model known as the Open System Interconnection (OSI) reference model, and the OSI reference model may include a physical layer that is provided by a physical layer transceiver (PHY) device 218 and a data link layer 220. The OSI reference model breaks communications functionality further into a network layer, a transport layer, a session layer, a presentation layer, and application layer (not illustrated). The IEEE 802.3 model facilitates the use of several mediums such as, for example, twisted pair technology, coaxial cable technology, copper technology, and fiber technology at speeds such as 10 Gbps, 25 Gbps, 40 Gbps, 50 Gbps, 100 Gbps, and higher. In addition, LAN's communicating information at legacy speeds such as 1 Megabit/sec, 10 Megabit/sec, 100 megabit/sec, and 1000 megabit/sec are considered by the IEEE 802.3, as well as other speeds that would be apparent to one of skill in the art in possession of the present disclosure.

The Ethernet transceiver device 216 includes a media dependent interface (MDI) 222 which may include a port (e.g., an RJ45 port, an SFP port, etc.) that is coupled to the PHY device 218. The PHY device 218 may include at least a physical medium dependent (PMD) layer 224, which then interfaces to a physical medium attachment (PMA) layer 226, which in turn interfaces with a physical coding sublayer (PCS) 228. However, in the later versions of the IEEE 802.3 standard, additional features like an auto-negotiation module 230, a forward error correction (FEC) module 232, and other features such as link training were added, but those features are not required in every PHY device 218. The PHY device 218 then connects with an interface such as a media independent interface (MII) 234 in 100 Mb/s systems, or a gigabit media independent interface (GMII) in 1+ Gb/s systems (e.g., XLGMII for 40 Gb/s system). Finally, the MII/GMII 234 connects to a reconciliation layer 236 of the data link layer 220, which in turn interfaces with a media access control (MAC) 238, which in turn interfaces with the link layer control 240.

As discussed above, the auto-negotiation module 230 may not be included in the communication subsystem 214. However, in various examples where the auto-negotiation module 230 is included in the communication subsystem 214, the auto-negotiation module 230 may include one or more auto-negotiation abilities such as, for example, a 100 GbE auto-negotiation ability, a 50 GbE auto-negotiation ability, a 25 GbE auto-negotiation ability, and/or any other auto-negotiation ability that would be apparent to one of skill in the art in possession of the present disclosure. Each auto-negotiation ability may be associated with corresponding auto-negotiation features that allow the local computing device 202 and another computing device (e.g., the peer device 204) to negotiate appropriate transmission parameters and settle on the highest, mutually supported set of transmission parameters.

As discussed above, the FEC module 232 may not be included on the communication subsystem 214. However, in various examples where the FEC module 232 is included in the communication subsystem 214, the FEC module 232 may include one or more FEC abilities such as, for example, BASE-R FEC (Firecode), Reed Solomon (RS)-FEC, and/or any other FEC that would be apparent to one of skilled in the art in possession of the present disclosure such as those defined by Clause 74 (CL74) and/or Clause 108 (CL108) of the IEEE 802.3by standard and/or as defined by the 25 Gigabit Ethernet Consortium. Furthermore, each FEC ability may include a plurality of modes that may each be associated with a specific media type. For example, the FEC ability may include a mode for AOC, SR, DAC, and/or other media types that would be apparent to one of skill in the art in possession of the present disclosure. The FEC ability may be enabled for AOC, SR, and/or DAC but not for LR.

The PHY device 218 may also include a plurality of registers 242 that, in some embodiments, may be included in the PCS 228 such that the PHY device 218 may communicate with the MAC 238 through the reconciliation layer 236. The plurality of registers 242 may store variable transmission parameters that define the operation modes of the Ethernet transceiver 216, and may also allow for the PHY device 218 to turn on and off the PMA layer 226, as well as restart an auto-negotiation process. In various examples, the plurality of registers may include a control register, a status register, a PHY identifier register, an auto-negotiation advertisement register, an auto-negotiation link partner base page ability register, an auto-negotiation expansion register, an auto-negotiation next page transmit register, an auto-negotiation link partner received next page register, one or more reserved registers, one or more vendor registers, and/or conventional registers that would be apparent to one of skill in the art in possession of the present disclosure. In an embodiment of the present disclosure, the PHY device 218 may also include PHY ability register(s) that store the settings of the PHY device 218 that are discussed in more detail below.

While specific components of the local computing device 202 have been illustrated and described, one of skill in the art in possession of the present disclosure will recognize that other components may be included in the chassis 208 and may be utilized to perform conventional computing device functionality, as well as the functionality described below, while remaining within the scope of the present disclosure. Furthermore, while a specific local computing device 202 is illustrated and has been briefly described, one of skill in art in possession of the present disclosure will recognize that the peer computing device 204 may include some or all of the components of the local computing device 202 described above (e.g., such that the peer computing device 204 may be a local computing device and/or the local computing device 202 may be a peer computing device). As such, in some examples the peer computing device 204 may include the same capabilities and/or default settings as the local computing device 202, while in other examples the peer computing device 204 may include different capabilities and/or default settings than those of the local computing device 202, as discussed in further detail below. For example, the peer computing device 204 may include different PHY device capabilities and/or default settings than the local computing device 202.

Figure 3:
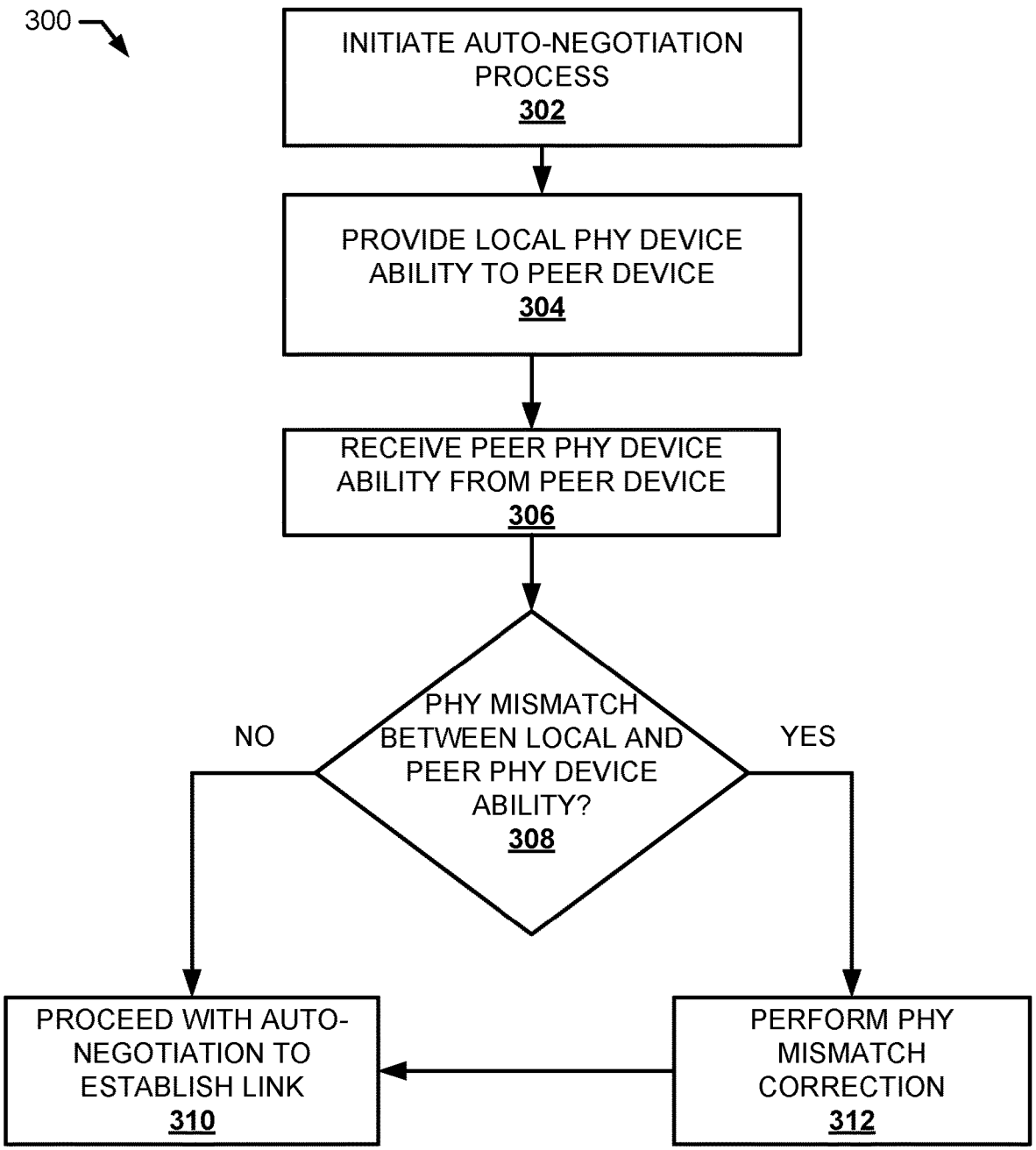
FIG. 3 is a flow chart illustrating an embodiment of a method for PHY ability auto-negotiation.

Referring now to FIG. 3 an embodiment of a method 300 for PHY ability auto-negotiation is illustrated. As discussed above, when establishing an Ethernet link between a local computing device and a peer computing device, an auto-negotiation processes may occur at the PHY to automatically bring up the link between the two computing devices. Conventionally, the auto-negotiation process occurs such that each computing device may learn possible operation modes based on link abilities provided by variable transmission parameters that the other computing device is configured to implement to transmit data. However, the creation of new standards defining PHY abilities (e.g., auto-negotiation, FEC, and/or other physical layer level features) has resulted in the possibility that each computing device may have slightly different PHY capabilities and/or default settings. For example, some computing devices may have some PHY abilities disabled, and/or may not have a particular PHY ability that exists and is enabled on its connected computing device. As discussed above, these mismatches in PHY abilities and/or default settings may prevent the link between the computing devices from being established, and requires a user of the computing devices to manually locate and change the PHY settings to correct the mismatch so that the link between the two computing devices may be established. In embodiments of the present disclosure, during auto-negotiation between the two computing devices, each computing device may transmit their respective PHY abilities to each other such that the computing devices may determine whether a mismatch exists, and automatically adjust the operation of the PHY device(s) to correct the mismatch. The PHY abilities may be provided during an auto-negotiation process and before any link abilities are exchanged between the computing devices.

Figure 4:
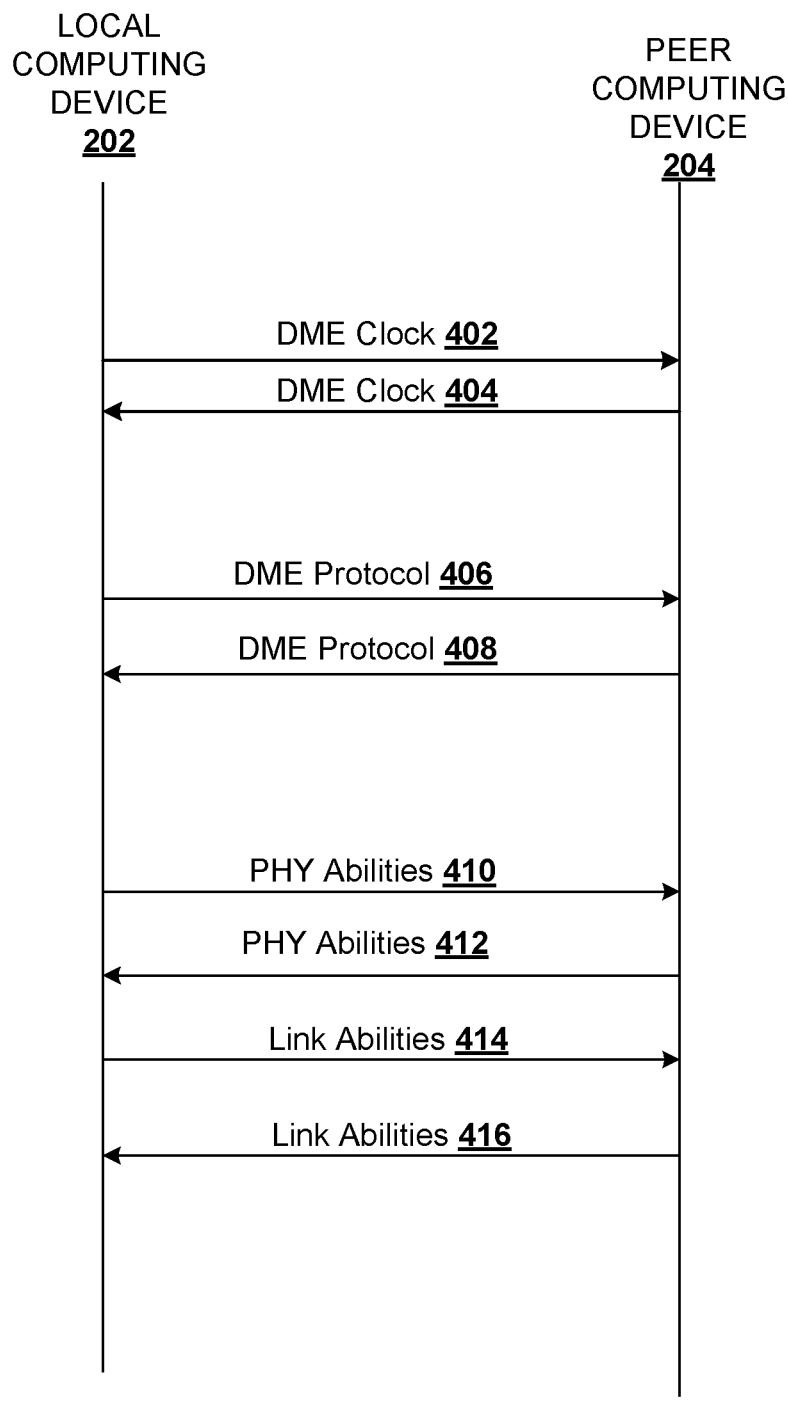
FIG. 4 is a flow diagram illustrating an embodiment the method of FIG. 3 being performed in the auto-negotiation system of FIG. 2.

The method 300 begins at block 302 where an auto-negotiation process is initiated. In an embodiment of block 302, the local computing device 202 may be coupled to the peer computing device 204 via the cable 206. FIG. 4 illustrates a flow diagram of the method 300 being performed in the auto-negotiation system 200. Upon connection of the cable 206, the local computing device 202 and/or the peer computing device 204 may perform initial communications via the cable 206 to begin the auto-negotiation process. For example, the local computing device 202 may provide a differential Manchester encoding signal (DME) clock signal 402 to the peer computing device 204, and the peer computing device 204 may provide a DME clock signal 404 to the local computing device 202. Subsequently, the local computing device 202 may provide a DME protocol signal 406 to the peer computing device 204, and the peer computing device 204 may provide a DME protocol signal 408 to the local computing device 202. The local computing device 202 and the peer computing device 204 may be operating in parallel such that the local computing device 202 and/or the peer computing device 204 are each providing the signals discussed above without knowledge of their connected computing device's signals. In an embodiment, the auto-negotiation module 230 may include a DME encoder that that generates the DME signals. The auto-negotiation process may be performed at a slower speed relative to data communication over the link, since the protocol support 1G speeds. The DME is mandated as the control channel encoding scheme to be used during auto-negotiation and link training. DME guarantees transition density and DC balance while the reduced rate of transmission facilitates reception over non-optimally equalized channels between the local computing device 202 and the peer computing device 204.

The method 300 then proceeds to block 304 where a PHY device ability message is provided. In an embodiment of block 304, the local computing device 202 may provide, through the MDI 222 (e.g., SPF port) via the cable 206 and to the peer computing device 204, a PHY device ability message 410 for the local computing device 202. Likewise, the peer computing device 204 may provide, through a port that is coupled to the cable 206 to the local computing device 202, a PHY device ability message 412 for the peer computing device 204. In various examples, a PHY device ability may be stored in the storage subsystem 212 and provided by the auto-negotiation management engine 210 through the communication subsystem 214 to the peer computing device 204 via the cable 206. However, in other examples the auto-negotiation module 230 of the PHY device 218 may retrieve, from a PHY device ability register (e.g., the PHY device ability register 243), the PHY device ability message 410 represented by PHY device ability register table 500 of FIG. 5. The auto-negotiation module 230 may then provide the PHY device ability message 410 as a PHY device ability page in the auto-negotiation process, and in various examples the PHY device ability page may be a base page in the auto-negotiation process.

In various examples, the PHY device ability message 410 and/or 412 may identify auto-negotiation capabilities supported by the PHY device 218 and whether those auto-negotiation capabilities are enabled. In various examples, the PHY device ability message 410 and/or 412 may identify FEC capabilities supported by the PHY device 218 and whether those FEC capabilities are enabled. One of skill in the art in possession of the present disclosure would recognize that other PHY device abilities may be included in the PHY device ability message 410 and/or 412. Referring to FIG. 5, a PHY device ability register table 500 illustrates an example of information that may be provided in the PHY device ability message 410 and/or 412 from the PHY device ability register 243. For example, the PHY device ability register 243 may include a first set of bits 502 that may indicate whether the PHY device 218 includes an auto-negotiation ability and whether that auto-negotiation ability is enabled. For example, a first bit of the first set of bits 502 may indicate that the PHY device 218 includes a 100G auto-negotiation ability and whether that 100G auto-negotiation ability is enabled. A second bit of the first set of bits 502 may indicate that that PHY device 218 includes a 50G auto-negotiation ability and whether that 50G auto-negotiation ability is enabled. A third bit of the first set of bits 502 may indicate that the PHY device 218 includes a 25G auto-negotiation ability and whether that 25G auto-negotiation ability is enabled.

In various examples, the PHY device ability register 243 may include a second set of bits 504 that may identify whether the PHY device 218 includes an FEC ability and whether that FEC ability is enabled. For example, a first bit of the second set of bits 504 may indicate that the PHY device 218 includes a Clause 91 RS-REC for 100 GbE FEC ability and whether that FEC ability is enabled. A second bit of the second set of bits 504 may indicate that the PHY device 218 includes a Clause 108 RS-REC for 25 GbE/50 GbE FEC ability and whether that FEC ability is enabled. A third bit of the second set of bits 504 may indicate that the PHY device 218 includes a Clause 74 Base-R or Firecode for 25 GbE/50 GbE FEC ability and whether that FEC ability is enabled. In various examples, the PHY device ability register 243 may include a third set of bits 506 that may indicate a media type connected to the PHY device 218. In various examples, the PHY device ability register 243 may also include a fourth set of bits 508 that may be reserved for future FEC types, and/or a fifth set of bits 510 that is reserved for other future use. While the PHY device ability register table 500 illustrated and described with reference to FIG. 5 includes a specific example of which PHY device abilities may be defined in the PHY device abilities register 243, one skilled in the art in possession of the present disclosure would recognize that the PHY device abilities register may include fewer or more bits, a different arrangement of what bit(s) define a particular ability, identification of other PHY device abilities, and/or other variations without departing from the scope of the present disclosure.

The method 300 then proceeds to block 306 where a PHY device ability is received. In an embodiment of block 306, the local computing device 202 may receive, through the MDI 222 (e.g., SPF port) via the cable 206, the PHY device ability message 412 of the peer computing device 204. Likewise, the peer computing device 204 may receive, through a port that is coupled to the cable 206, the PHY device ability message 410 of the local computing device 202.

The method 300 then proceeds to block 308 where a determination is made as to whether the received PHY device ability and the provided PHY device ability indicate a PHY device ability mismatch. In an embodiment of block 308, the auto-negotiation module 230 and/or the auto-negotiation management engine 210 may compare the PHY device abilities of the local computing device 202 to the PHY device abilities of the peer computing device 204 to determine whether there is a PHY ability mismatch. Likewise, the peer computing device 204 may compare the PHY device abilities of the peer computing device 204 to the received PHY device abilities of the local computing device 202 to determine whether there is a PHY device ability mismatch. If there is no mismatch, the method 300 may proceed to block 310 where the auto-negotiation process proceeds conventionally. For example, the local computing device 202 may provide, through the MDI 222 (e.g., SPF port) via the cable 206 to the peer computing device 204, a link ability message 414 that includes the variable transmission parameters of the local computing device 202. Likewise, the peer computing device 204 may provide, through a port that is coupled to the cable 206 to the local computing device 202, a link ability message 416 that includes the variable transmission parameters of the peer computing device 204. The link ability message 414 and 416 may indicate which modes of operation are available via the communication subsystem 214. For example, the link ability messages 414 and 416 may indicate available operation modes such as, for example, 100G_CR4, 100G_KR4, 50_CR2, 50G_KR2, 25G_CR, 25G_KR, whether FEC is required, and/or other operation mode characteristics that would be apparent to one of skill in the art in possession of the present disclosure. Each of the local computing device 202 and the peer computing device 204 may then use these link abilities to determine the highest common operation mode at which both computing devices 202 and 204 can transmit data according to the auto-negotiation algorithm. Subsequently, upon completion of the auto-negotiation process, the link between the local computing device 202 and the peer computing device is established and operates at that highest common operation mode.

However, if it is determined at block 308 that there is a PHY device ability mismatch, then the method 300 proceeds to block 312 where PHY device ability mismatch correction is performed. In an embodiment of block 312, the local computing device 202 may determine that there is a PHY device ability mismatch and, in response, may adjust the operation of the local computing device 202 to correct the PHY ability mismatch. For example, the local computing device 202 may disable a PHY operation that is currently enabled at the local computing device 202 in order to match the PHY ability of the peer computing device 204 that is either disabled, or that does not exist in the peer computing device 204. Similarly, the peer computing device 204 may disable a PHY operation that is currently enabled at the peer computing device 204 in order to match the PHY ability of the local computing device 202 that is either disabled, or that does not exist such in the local computing device 204.

With the local computing device 202 and the peer computing device 204 performing the auto-negotiation process in parallel, the local computing device 202 and the peer computing device 204 may be configured with a PHY device ability mismatch correction rule that only allows the computing device that has the enabled PHY device ability to correct the mismatch. This ensures that both the local computing device 202 and the peer computing device 204 do not perform respective correction operations which result in a subsequent mismatch. For example, if a PHY device ability of the peer computing device 204 is disabled and the peer computing device 204 enables it to correct the PHY device ability mismatch, because a mismatch may again result if the local computing device 202 disables the operation associated with that PHY device ability. Furthermore, the prioritization of the disabling of PHY operations that are enabled at the local computing device 202 in order to correct for a PHY device ability mismatch accounts for situations where the peer computing device 204 may not have that PHY ability as an option due to, for example, the peer computing device 204 being manufactured before the PHY device ability was available. However, one of skill in the art in possession of the present disclosure would recognize that PHY device ability mismatches may be corrected by enabling a PHY operation associated with a PHY device ability that is indicated as currently disabled without departing from the scope of the present disclosure. For example, a PHY abilities page is first exchanged by the local peer device 202 and the local computing device 202 waits for a response from the peer computing device 204 for a finite time which is user configurable. If the local computing device 202 does not get a response in time from peer computing device 204, the local computing device 202 will start exchanging the link abilities.

In various embodiments, the local computing device 202 and/or the peer computing device 204 may provide an administrator a mismatch notification that identifies the PHY ability mismatch when, for example, that local computing device 202 and/or the peer computing device 204 cannot correct the mismatch. For example, the mismatch notification may be provided to the administrator by the local computing device 202 and/or the peer computing device 204 if that local computing device 202 and/or peer computing device 204 are unable to change their respective PHY operations. In various examples, the mismatch notification may be provided by one or more visual indicators coupled to the computing device (e.g., one or more light emitting diodes (LEDs) included in the communication subsystem 214), a notification via a graphical user interface (GUI) (e.g., a GUI that is displayed on a display device coupled to the auto-negotiation engine 210, a display device coupled to an administrator device that is coupled to the communication subsystem 214 via a network, and/or a display device coupled to any other device that would be apparent to one of skill in the art in possession of the present disclosure), and/or a notification via any other mismatch indicator that would be apparent to one of skill in the art in possession of the present disclosure. The mismatch notification may identify which PHY device abilities are mismatched in order to allow the administrator to manually adjust the operations of the local computing device 202 and the peer computing device 204. Once the PHY device ability mismatch is corrected, the method 300 may proceed to block 310 where conventional auto-negotiation processes may be performed to establish the link between the local computing device 202 and the peer computing device 204. However, in other embodiments such as, for example, when there is a mismatch that disables auto-negotiation, the link between the local computing device 202 and the peer computing device 204 may be established under a forced mode with or without the FEC.

The following discussion provides several use cases for the systems and methods of the present disclosure. In a first example, the cable 206 may include a 25GBASE AOC cable, the PHY abilities of the local computing device 202 may include PHY_ABILITIES={25G_AN=1, CL108_FEC=1, media=0x01}, and the PHY abilities of the peer computing device 204 may include PHY_ABILITIES={25G_AN=1, CL108_FEC=1, media=0x01}. In this example, both of the PHYs of the local computing device 202 and the peer computing device 204 request 25G_AN and CL108_FEC capability, and link abilities are exchanged at block 310 of the method 400 to establish a link between the local computing device 202 and the peer computing device 204, with CL108 FEC enabled on the link after completion of the auto-negotiation process.

In another example, the cable 206 may include a 25GBASE AOC cable, the PHY abilities of the local computing device 202 may include PHY_ABILITIES={25G_AN=0, CL108_FEC=1, media=0x01}, and the PHY abilities of the peer computing device 204 may include PHY_ABILITIES={25G_AN=1, CL108_FEC=1, media=0x01}. In this example, the local computing device 202 does not request to auto-negotiate at 25 GbE, and the exchange of PHY ability messages 410 and 412 identifies a mismatch in the auto-negotiation abilities, which may result in the peer computing device 204 disabling the auto-negotiation. As such, the link between the local computing device 202 and the peer computing device 204 may be established using forced mode with CL108-FEC enabled automatically, and without the user having to manually disable the auto-negotiation at the peer computing device 204.

In another example, the cable 206 may include a 25GBASE-CR CA-N, 1 meter DAC cable, the PHY abilities of the local computing device 202 may include PHY_ABILITIES={25G_AN=1, CL74_FEC=1, CL108_FEC=0, media=0x0D}, and the PHY abilities of the peer computing device 204 may include PHY_ABILITIES={25G_AN=1, CL74_FEC=1, CL108_FEC=1, media=0x0D}. In this example, the local computing device 202 does not request CL108_FEC, and the exchange of PHY abilities identifies a mismatch in the FEC abilities, which may result in the peer computing device 204 disabling the CL108_FEC. As such, the link between the local computing device 202 and the peer computing device 204 may be established using auto-negotiation with CL74-FEC enabled automatically, and without the user having to manually disable the CL108_FEC at the peer computing device 204.

In yet another example, the cable 206 may include a 25GBASE-CR CA-N 1 meter DAC cable, the PHY abilities of the local computing device 202 may include PHY_ABILITIES={25G_AN=1, CL74_FEC=1, CL108_FEC=0, media=0x0D}, and the PHY abilities of the peer computing device 204 may include PHY_ABILITIES={25G_AN=0, CL74_FEC=1, CL108_FEC=1, media=0x0D}. In this example, the local computing device 202 does not request CL108_FEC and the peer computing device does not request auto-negotiation, and the exchange of PHY abilities identifies a mismatch in the FEC abilities and the auto-negotiation abilities, which may result in the peer computing device 204 disabling the CL108_FEC while the local computing device 202 disables the 25G_AN. As such, the link between the local computing device 202 and the peer computing device 204 may be established using forced mode with CL74-FEC enabled automatically, and without the user having to manually disable the CL108_FEC at the peer computing device 204 and/or having to manually disable the 25G_AN at the local computing device 202.

In yet another example, the cable 206 may include a 25GBASE AOC cable that is type 0x18, the PHY abilities of the local computing device 202 may include PHY_ABILITIES={25G_AN=0, CL74_FEC=1, CL108_FEC=1, media=0x18}, and the PHY abilities of the peer computing device 204 may include PHY_ABILITIES={25G_AN=0, CL74_FEC=1, CL108_FEC=1, media=0x01}. In this example, there is a FEC mode mismatch due to the media type 0X18 not being support on the CL108_FEC, and the link is not established between the local computing device 202 and the peer computing device 204 due to that FEC mode mismatch, (i.e. the local computing device may disable FEC while the peer computing device 204 continues to enable FEC because the FECs are the same between the local computing device 202 and the peer computing device 204 except for the media type mode). However, the auto-negotiation management engine 210 may provide a mismatch notification to the administrator identifying that the media types of the FEC are mismatched, and the administrator may then manually disable the FEC at the peer computing device 204 and allow the link to be established. In this use case, if the media type detection bits were not available in the PHY ability messages 410 and/or 412, the administrator may have never known why the link failed to come up, or may have had to perform many troubleshooting techniques to determine that the FEC media types are mismatched.

Thus, systems and methods have been described that provide for auto-negotiation of transmission parameters between two computing devices coupled together by a cable. The auto-negotiation may include the exchange of the PHY device abilities between each computing device that is part of the link. These PHY abilities may be provided before any link abilities that are used to auto-negotiate the highest common operation mode of the two computing devices when establishing a link for data transmission. Therefore, if there is a mismatch in these PHY abilities, one or more of the computing devices may correct the mismatch automatically in order to allow the link to be established using a common auto-negotiation operation or using forced speed mode. Thus, the auto-negotiation systems and methods of the present disclosure reduce the time needed to debug auto-negotiation and forward error correction related issues when establishing a link between computing devices that may have been manufactured or otherwise configured according to different standards.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An auto-negotiation system, comprising:
   a first computing device having a first communication subsystem that includes a first physical layer transceiver (PHY) device and a first port that is coupled to the first PHY device and that is configured to operate in at least one mode; and
   a second computing device having a second communication subsystem that includes a second PHY device and a second port that is coupled to the second PHY device and that is configured to operate in at least one mode, wherein the first port and the second port are coupled together via a cable, and wherein the second computing device is configured to:
      provide, through the second port via the cable to the first computing device and prior to advertising the at least one mode that the second port is configured to operate in, a second PHY ability of the second PHY device;
      receive, through the second port via the cable from the first computing device, a first PHY ability of the first PHY device; and
      determine that a mismatch exists between the first PHY ability and the second PHY ability and, in response, adjust an operation of the second PHY device to correct the mismatch.

2. The system of claim 1, wherein the adjusting the operation of the second PHY device to correct the mismatch includes disabling the second PHY ability on the second PHY device when the second PHY ability is not enabled on the first PHY device.

3. The system of claim 1, wherein the first computing device is configured to:
   provide, through the first port via the cable to the second computing device and prior to advertising the at least one mode that the first port is configured to operate in, the first PHY ability;
   receive, through the first port via the cable from the second computing device, the second PHY ability of the second PHY device; and
   determine that a mismatch exists between the first PHY ability and the second PHY ability and, in response, adjust the operation of the first PHY device to correct the mismatch.

4. The system of claim 3, wherein the adjusting the operation of the first PHY device to correct the mismatch includes disabling the first PHY ability on the first PHY device when the first PHY ability is not enabled on the second PHY device.

5. The system of claim 1, wherein the first PHY ability and the second PHY ability each include at least one of an auto-negotiation ability and error correction ability.

6. The system of claim 1, wherein the second PHY ability is provided in a base page of an auto-negotiation process performed by the second PHY device.

7. The system of claim 1, wherein the second computing device is further configured to:
   provide, through the second port to the first computing device via the cable in response to the adjusting the operation of the second PHY device to correct the mismatch, a second link ability that advertises the at least one mode that the second port is configured to operate in.

8. The system of claim 1, wherein the adjusting the operation of the second PHY device to correct the mismatch includes providing a notification of the mismatch to an administrator via an indicator included on the second computing device.

9. An Information Handling System(IHS), comprising:
   a first communication subsystem that includes a first physical layer transceiver (PHY) device and a first port that is coupled to the first PHY device and that is configured to operate in at least one mode;
   a processing system coupled to the first communication subsystem; and
   a memory system that is coupled to the processing system and that includes instructions that, when executed by the processing system, cause the processing system to:
      provide, through the first port via a cable to a second computing device and prior to advertising the at least one mode that the first port is configured to operate in, a first PHY ability of the first PHY device, wherein the second computing device has a second communication subsystem that includes a second PHY device and a second port that is coupled to the second PHY device and that is configured to operate in at least one mode, and wherein the first port and the second port are coupled together via a cable;
      receive, through the first port via the cable from the second computing device, a second PHY ability of the second PHY device; and
      determine that a mismatch exists between the first PHY ability and the second PHY ability and, in response, adjust an operation of the first PHY device to correct the mismatch.

10. The IHS of claim 9, wherein the adjusting the operation of the first PHY device to correct the mismatch includes disabling the first PHY ability on the first PHY device when the first PHY ability is not enabled on the second PHY device.

11. The IHS of claim 9, wherein the second computing device is configured to:
   provide, through the second port via the cable to the first port and prior to advertising the at least one mode that the second port is configured to operate in, the second PHY ability;
   receive, through the second port via the cable from the first port, the first PHY ability of the first PHY device; and
   determine that a mismatch exists between the PHY ability and the second PHY ability and, in response, adjust the operation of the second PHY device to correct the mismatch.

12. The IHS of claim 11, wherein the adjusting the operation of the second PHY device to correct the mismatch includes disabling the second PHY ability on the second PHY device when the second PHY ability is not enabled on the first PHY device.

13. The IHS of claim 9, wherein the first PHY ability and the second PHY ability each include at least one of an auto-negotiation ability and error correction ability.

14. The IHS of claim 9, wherein the first PHY ability is provided in a base page of an auto-negotiation process performed by the first PHY device.

15. The IHS of claim 9, wherein the adjusting the operation of the first PHY device to correct the mismatch includes providing a notification of the mismatch to an administrator via an indicator coupled to the processing system.

16. A method for PHY ability auto-negotiation, comprising:
providing, by a first computing device, a first PHY ability of a first physical layer transceiver (PHY) device via a cable to a second computing device, wherein the first PHY ability is provided through a first port that is configured to operate in at least one mode and that is coupled to the first PHY device, and is provided through the first port prior to advertising the at least one mode that the first port is configured to operate in, wherein the second computing device includes a second PHY device and a second port that is coupled to the second PHY device and that is configured to operate in at least one mode, and wherein the first port and the second port are coupled together via the cable;
receiving, by the first computing device through the first port via the cable from the second computing device, a second PHY ability of the second PHY device; and
determining, by the first computing device, that a mismatch exists between the first PHY ability and the second PHY ability and, in response, adjusting an operation of the first PHY device to correct the mismatch.

17. The method of claim 16, wherein the adjusting the operation of the first PHY device to correct the mismatch includes disabling the first PHY ability on the first PHY device when the first PHY ability is not enabled on the second PHY device.

18. The method of claim 16, wherein the first PHY ability and the second PHY ability each include at least one of an auto-negotiation ability and error correction ability.

19. The method of claim 16, wherein the first PHY ability is provided in a base page of an auto-negotiation process performed by the first PHY device.

20. The method of claim 16, wherein the adjusting the operation of the first PHY device to correct the mismatch includes providing a notification of the mismatch to an administrator via an indicator coupled to the first computing device.

* * * * *